(12) United States Patent
Byers et al.

(10) Patent No.: US 8,019,926 B2
(45) Date of Patent: Sep. 13, 2011

(54) AUTOMATICALLY ASSIGNING A MULTI-DIMENSIONAL PHYSICAL ADDRESS TO A DATA STORAGE DEVICE

(75) Inventors: Daniel J. Byers, Parker, CO (US); Travis Jones, Centennial, CO (US)

(73) Assignee: Quantum Corporation, San Jose, CA (US)

( * ) Notice: Subject to any disclaimer, the term of this patent is extended or adjusted under 35 U.S.C. 154(b) by 568 days.

(21) Appl. No.: 12/167,658

(22) Filed: Jul. 3, 2008

(65) Prior Publication Data

US 2010/0005236 A1 Jan. 7, 2010

(51) Int. Cl.
G06F 12/00 (2006.01)

(52) U.S. Cl. ............ 711/4; 711/111; 711/114; 711/221; 360/71; 360/92.1

(58) Field of Classification Search .................. None
See application file for complete search history.

(56) References Cited

U.S. PATENT DOCUMENTS

| | | | | |
|---|---|---|---|---|
| 6,052,341 A | * | 4/2000 | Bingham et al. | 711/112 |
| 6,144,519 A | * | 11/2000 | Hanaoka et al. | 360/92.1 |
| 6,625,732 B1 | * | 9/2003 | Weirauch et al. | 726/26 |
| 6,725,394 B1 | * | 4/2004 | Bolt | 714/7 |
| 7,647,469 B2 | * | 1/2010 | Gallo et al. | 711/200 |
| 2002/0161971 A1 | * | 10/2002 | Dimitri et al. | 711/114 |
| 2005/0177268 A1 | * | 8/2005 | Morinaga et al. | 700/121 |
| 2006/0174036 A1 | * | 8/2006 | Dain et al. | 709/245 |
| 2008/0301396 A1 | * | 12/2008 | Hamada et al. | 711/202 |

* cited by examiner

Primary Examiner — Jack A Lane

(57) ABSTRACT

A method of assigning a multi-dimensional physical address to a tape-based data storage device is provided. The method includes accessing a first signal from a first communication path electrically coupled to a first tape-based data storage device, wherein the first signal indicates a physical position of the first tape-based data storage device with respect to a first axis. The method further includes accessing a second signal from a second communication path electrically coupled to the first tape-based data storage device, wherein the second signal is associated with a physical position of the first tape-based data storage device with respect to a second axis. The method also includes determining a unique physical location of the first tape-based data storage device in the second axis based on the second signal and assigning a unique physical address to the first tape-based data storage device, wherein the unique physical address is based on the physical position of the first tape-based data storage device in the first axis and based on the physical position of the first tape-based data storage device in the second axis.

22 Claims, 5 Drawing Sheets

300

---

Accessing a first signal from a first communication path electrically coupled to a first tape-based data storage device, said first signal indicating a physical position of said first tape-based data storage device with respect to a first axis
310

---

Accessing a second signal from a second communication path electrically coupled to said first tape-based data storage device, said second signal associated with a physical position of said first tape-based data storage device with respect to a second axis
320

---

Determining a unique physical location of said first tape-based data storage device in said second axis based on said second signal
330

---

Assigning a unique physical address to said first tape-based data storage device, said unique physical address based on said physical position of said first tape-based data storage device in said first axis and based on said physical position of said first tape-based data storage device in said second axis
340

FIG. 3

Error Report
510

Drive XXXX-XXX-XXX has been identified as having a failure.

Location: Server room B, Rack 11, Shelf 3, Over 3 from Right side.

AUTOMATICALLY ASSIGNING A MULTI-DIMENSIONAL PHYSICAL ADDRESS TO A DATA STORAGE DEVICE

BACKGROUND

On many storage devices, for example RAID (Redundant Array of Independent Disks) and tape libraries, assigning a device address is required. For example, in a tape library, tape drives could use a serial number for a unique identity within the tape library. This allows the tape library controller to communicate with any tape drive in the system, but the library controller does not have information on the physical tape drive location.

The host uses the address when commanding the tape library controller to place a tape cartridge into the drive the host needs to use. The tape library controller can communicate with all the tape drives because they have a unique communication address, but the tape library controller does not know where any of the drives are located.

When the tape library controller gets a host command to load a tape cartridge into a drive at specific address, the tape library controller needs to communicate with that specific drive address to get the drive status. The drive status tells the tape library controller information like, whether the drive can be loaded, or if the load completed, or if error conditions exist. Problems arise because the device address does not correspond to a physical location of the device.

In a RAID system, devices which have errors can be identified by blinking the LED of the failed drive. On larger systems with multiple components such as servers, RAID, Ethernet and Fiber Channel switches, the serial number of the component with an error would be indicated on an operator panel. The difficult task of finding the failed device in the large array of devices is then left to the customer engineer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of assigning a multi-dimensional physical address to a tape-based data storage device is provided. The method includes accessing a first signal from a first communication path electrically coupled to a first tape-based data storage device, wherein the first signal indicates a physical position of the first tape-based data storage device with respect to a first axis. The method further includes accessing a second signal from a second communication path electrically coupled to the first tape-based data storage device, wherein the second signal is associated with a physical position of the first tape-based data storage device with respect to a second axis. The method also includes determining a unique physical location of the first tape-based data storage device in the second axis based on the second signal and assigning a unique physical address to the first tape-based data storage device, wherein the unique physical address is based on the physical position of the first tape-based data storage device in the first axis and based on the physical position of the first tape-based data storage device in the second axis.

A system for assigning a multi-dimensional physical address to a tape-based data storage device is also provided.

DESCRIPTION OF THE DRAWINGS

The accompanying drawings, which are incorporated in and form a part of this specification, illustrate embodiments of the subject matter and, together with the description, serve to explain principles discussed below:

FIG. 3 shows a flow diagram of an example method of assigning a multi-dimensional physical address to a tape-based data storage device, according to an embodiment.

FIG. 5 shows an example graphical user interface showing an example error report including directions to the physical location of a failed drive, according to an embodiment.

Figure 1:
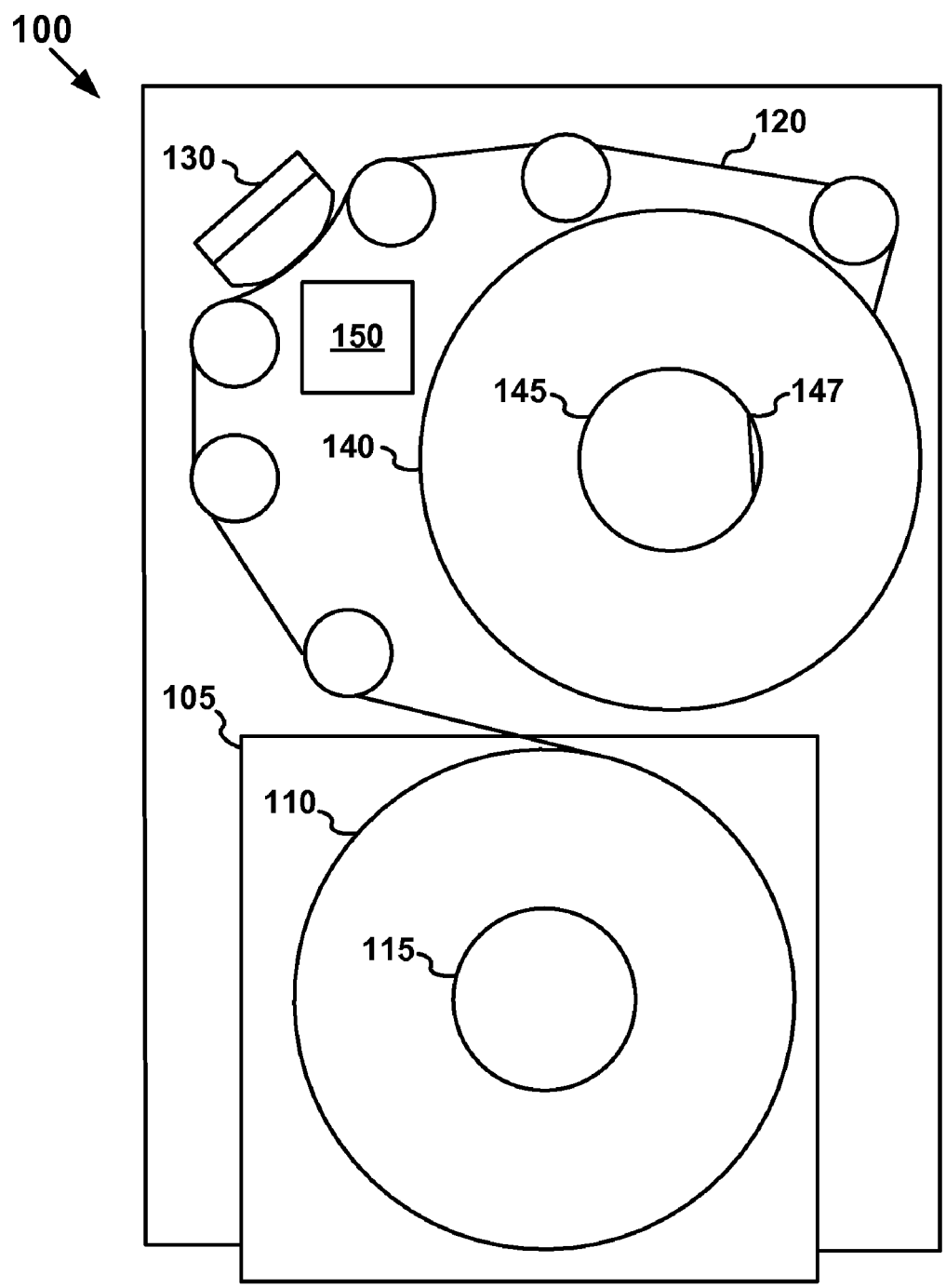
FIG. 1 is a diagram of an example tape drive incorporating an embodiment of the subject matter described herein.

The drawings referred to in this description should be understood as not being drawn to scale unless specifically noted.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following detailed description, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the detailed description, discussions utilizing terms such as "accessing," "measuring," "correlating," "translating," "determining," "providing," "assigning," "mapping," "utilizing," "outputting," "identifying," "reporting," or the like, refer to the actions and processes of a computer system, measurement module, microcontroller, processor, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. In some embodiments, as described herein, a processor and/or address determiner module resides within and/or is coupled with a tape-based data storage device.

Overview of Discussion

Each device bay within a storage array requires a unique logical and physical address. Within each module, any device bay has a uniquely fixed or hard-wired address to locate it within the module, but the module itself does not have a unique fixed address within the storage array. A unique logical address is needed for direct digital communication to the device within the bay, but a unique physical address is required for physical interaction with the device such as, but not limited to, robotics motion to/from the device, or showing a physical representation of the storage array on a graphical user interface (GUI). For these reasons, correlating the logical and physical addresses for each device is necessary. Further, to avoid human error and minimize system complexity and variation, it is necessary to have each of these addresses assigned automatically within the storage array.

Assigning a unique logical address to any device can be done with many methods, such as, but not limited to, using the device serial number or auto-negotiation of address. Assigning a logical address which corresponds to a physical address complicates the address assignment problem because the mapping between physical and logical addresses must be known.

Embodiments of the present invention disclose a method for automatically assigning physical and logical addresses to devices within a storage array where the storage array is made up of one or more scalable modules and each module may contain multiple storage devices. Embodiments of the present invention automatically assign a unique physical address based on a device's physical location in two or more dimensions. This unique address is used both for a unique logical address for communication and physical address to locate the device within the system.

Discussion will begin with a description of an example tape drive with which, or upon which, embodiments described herein may operate. Discussion will proceed to a description of an example address determiner module for a tape drive, which operates to automatically assign a multi-dimensional physical address to a tape-based data storage device. Components of the address determiner module will be described. Operation of the example address determiner module and its components will then be described in more detail in conjunction with a description of an example method of automatically assigning a multi-dimensional physical address to a tape-based data storage device.

Example Tape Drive

FIG. 1 is a diagram of an example tape drive 100 incorporating an embodiment of the subject matter described herein. Tape drive 100 represents a generic tape drive, and is shown by way of example and not of limitation. It is appreciated that the subject matter described herein is not limited to use with/ within tape drive 100, but instead is operable with/within a variety of tape drives. Tape drive 100 is shown with a tape cartridge 105 inserted into tape drive 100. Tape cartridge 105 is removable from tape drive 100, and includes a cartridge reel 110 with a cartridge reel hub 115. Tape 120 is spooled about cartridge reel hub 115 of cartridge reel 110. Tape cartridge 105 supplies tape 120 to tape drive 100. Tape drive 100 includes a drive reel 140 which takes up tape 120 from tape cartridge 105 (when inserted).

A portion of tape 120 (such as a leader) is coupled to drive reel hub 145 by means of a fastening device 147, such as, for example, a grabber or buckler. Fastening device 147 engages tape 120 and then integrates or blends with drive reel hub 145, thereby coupling tape 120 to drive reel hub 145.

During operation of tape drive 100 and drive reel 140, tape 120 is spooled between drive reel 140 and cartridge reel 110 and in the process is guided longitudinally across head 130.

Head 130 operates to read data from or write data to tape 120 as tape 120 travels longitudinally in proximity to head 130 while being spooled between drive reel 140 and cartridge feel 110.

Address determiner module 150 is communicatively coupled with head 130 and with drive reel 140 (e.g., to a motor or encoder coupled with cartridge reel 110) and, in one embodiment, enables communication between the drive 100 and a controller or host (not shown) by automatically assigning a multi-dimensional physical address to the drive 100.

Example Address Determiner Module

Figure 2:
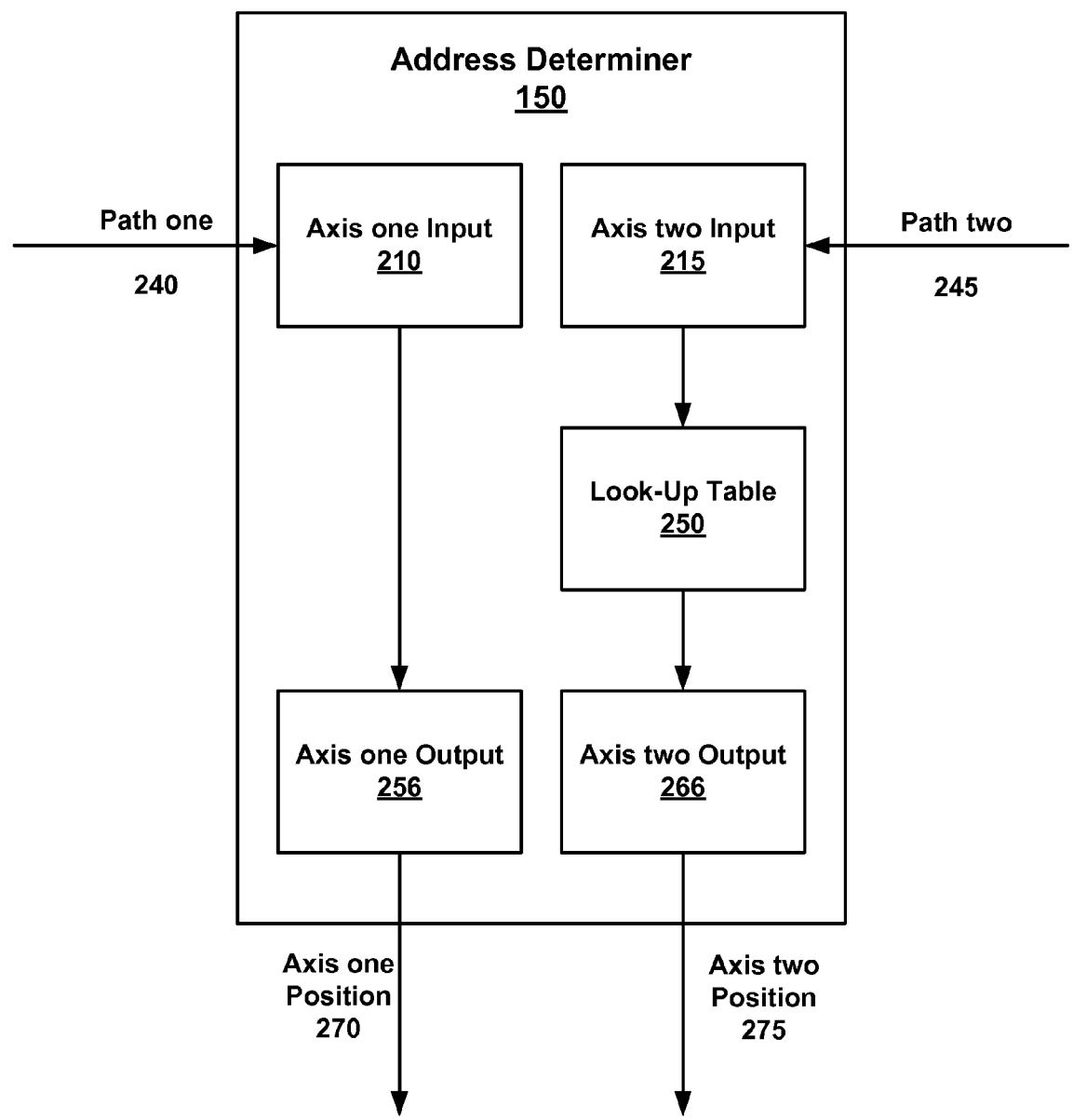
FIG. 2 shows a block diagram of an exemplary address determiner for automatically determining a multi-dimensional device address associated with a physical location of a tape-based data storage device, according to an embodiment.

FIG. 2 shows a block diagram of example address determiner module 150. Address determiner module 150 may reside within a tape-based data storage device or may reside outside a tape-based data storage device. For example, address determiner module 150 may be a stand alone device such as a plug connector for a tape-based data storage device.

Address determiner module 150 samples one or more communication paths electrically coupled to a tape drive to automatically determine an address that corresponds to the physical location of the drive with respect to a plurality of drives. In one embodiment, the device address is multi-dimensional and includes location information for two or more dimensions.

The address determiner 150 of FIG. 2 includes a first input 210 for accessing communication path one 240. Input 210 is for accessing a signal associated with the physical location of a particular tape drive with respect a first axis. In one embodiment, the signal accessed at input one 240 includes a device address that can be translated to a physical location, using look-up table 250. In one embodiment, the first signal originates at a "terminator" device (not shown). In another embodiment, the first signal includes a physical address that is generated by an adjacent device.

A "terminator" device is the device at the beginning of a string of devices. The terminator sets the base address for which all devices downstream of the terminator device use to determine their address. Once the termination address is established, any devices connected downstream of the terminator automatically establish their own unique address without user involvement.

The address determiner 150 of FIG. 2 includes a second input 215 for accessing communication path one 245. Input 215 is for accessing a signal associated with the physical location of a particular tape drive with respect a second axis. In one embodiment, the signal accessed at input two 245 includes a device address that can be translated to a physical location, using look-up table 250. In one embodiment, the first signal originates at a "terminator" device (not shown). In another embodiment, the second signal includes a physical address that is generated by an adjacent device.

The address determiner 150 generates a predefined output address (axis one position 270 and axis two position 275) based on its input address (path one 240 and path two 245) and no addresses are repeated within an array of devices. The translation between input address and output address is performed by the look-up table 250. As devices are added to the array, each module is automatically assigned a new unique address using the address determiner 150. A device bay location address within a module is concatenated to the module's unique storage array address to provide a unique address for each device in the storage array. Embodiments of the invention allow each module within the array to be exactly the same as the others, but when the modules are connected together, a unique address is generated in each module.

In one embodiment, the look-up table is only used for determining an address in one axis. For example, when one of the input signals includes a physical address from an adjacent device, the look-up table serves as an automatic off-set so that the output for that particular axis is incremented to account for that device when sent to the next adjacent device.

Example Methods of Operation

The following discussion sets forth in detail the operation of some example embodiments. With reference to FIG. 3, flow diagram 300 illustrates example procedures used by various embodiments. Flow diagram 300 includes processes that, in various embodiments, are carried out by a processor under the control of computer-readable and computer-executable instructions. The computer-readable and computer-executable instructions for executing the method illustrated by flow diagram 300 reside, for example, in any tangible computer-readable media, such as data storage features internal or external to tape drive 100.

For example, in one embodiment the computer-readable and computer-executable instructions, reside on computer-readable media such as a ROM or firmware of a microcontroller which, is/are used to perform the functions of, or operate in conjunction with, for example, address determiner module 150 of FIGS. 1 and 2. In another example, such computer-readable and computer-executable instructions may reside on a computer-readable storage media such as a diskette (e.g., a Compact Disc Read Only Memory (CD-ROM)) which is used to control operation of a processor in a computer system coupled with tape drive 100.

Although a specific flow of procedures is disclosed in flow diagram 300, such a flow is provided for example. That is, embodiments are well suited to performing various other procedures or variations of the procedures recited in flow diagram 300. It is appreciated that the procedures in flow diagram 300 may be performed in an order different than presented, and that not all of the procedures in flow diagram 300 may be performed in every embodiment.

FIG. 3 shows a flow diagram 300 of an example method of automatically determining a multi-dimensional address for a tape-based storage device according to an embodiment. In one embodiment, the method 300 automatically determines a physical address of a tape drive that is unique and directly associated with the physical location of the tape drive. In one embodiment, the physical address includes location information associated with two or more dimensions. For example, the location information can include X and Y coordinate information.

At 310, 300 includes accessing a first signal from a first communication path electrically coupled to a first tape-based data storage device, the first signal indicating a physical position of the first tape-based data storage device with respect to a first axis. In one embodiment, the first signal is generated by a second tape-based storage drive that is electrically coupled with the first communication path. In one embodiment, the second drive resides physically on at least one axis common to both the first and second drives.

At 320, 300 includes accessing a second signal from a second communication path electrically coupled to the first tape-based data storage device, the second signal associated with a physical position of the first drive with respect to a second axis. In one embodiment, the second signal is generated by a second tape-based storage drive that is electrically coupled with the second communication path. In one embodiment, the second drive resides physically on at least one axis common to both the first and second drives.

At 330, 300 includes determining a unique physical location of the first tape-based data storage device in said second axis based on the second signal. In one embodiment, 330 includes using a look-up table to translate the second signal to a unique physical address. In one embodiment, the look-up table includes a mapping of various signals to a plurality of unique locations in at least one axis.

Figure 4:
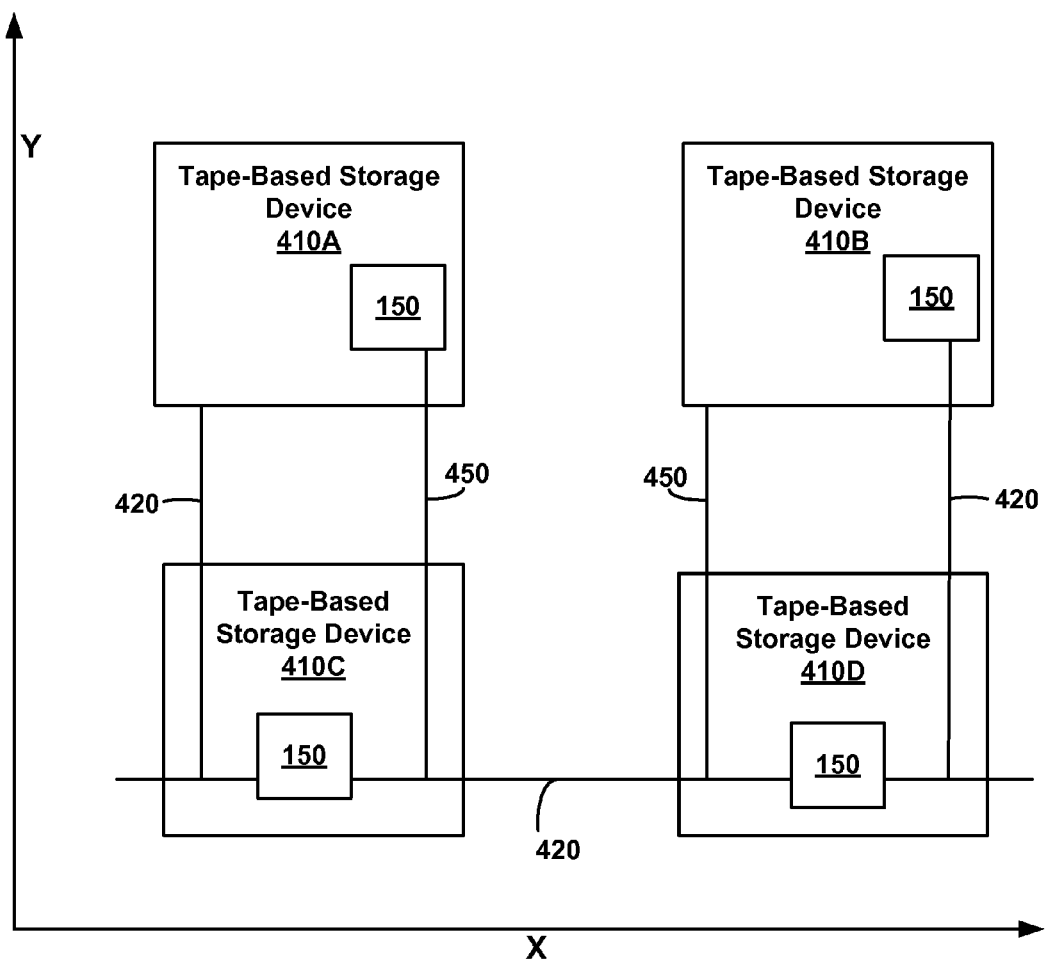
FIG. 4 shows a block diagram of a system for automatically determining a plurality of multi-dimensional physical addresses for a plurality of tape-based data storage devices, according to an embodiment.

FIG. 4 shows an example of addressing modules in two dimensions (labeled "x" and "y" in the diagram) but embodiments of the present technology could be expanded to more dimensions. For example, this method could be utilized in a star shaped storage array. Previous addressing conventions required signal wires to go out and return for each dimension or leg of the star. The new method only requires a single set of wires for any leg of the star.

All like devices connected to the storage array are also exactly the same as each other. When they are plugged into the array, they obtain a unique address. For example, when a device is plugged into one module, it may have an address of 110. If the same device is plugged into another module, the address will change to another address such as 112. If a new device is inserted into the old address 110 position, the new device will assume 110 address. No dip switches or jumpers need to be changed and the hardware in one module is the same as the hardware in another module. The new address is based only on which module the device is plugged into.

In one embodiment, a terminator module is used at the beginning of an array of devices. The terminator module sets the initial address for which all subsequent addresses are based from.

Because these physical addresses get assigned in a predefined, deterministic order, the mass storage system controller uses an algorithm to map between a physical address and the element address used by a host. This mapping is fixed and does not change. When a new device is plugged into a system, it uses the physical address as a communication address and reports in to the system controller. The system controller uses this address to locate the device physically in the array. The system controller can directly correlate the communication address to the physical element address that may be sent in a command from a host.

A mass storage array could also use the geographic address to physically identify a failed device. Instead of relying on a human to find a blinking LED or barcode label serial number, a system graphic identifying the failed component's physical location within the system is displayed on the operator interface. This makes finding the failed component much less error prone.

FIG. 5 is an example error report 510 that can be provided to a user interface for indicating an error associated with one or more tape drives in accordance with an embodiment. In one embodiment, the physical location of a failed device is provided to enable quick access to the failed device. In prior solutions, the failed device had to be "found" among many other devices, many times by looking for a specific device serial number.

Embodiments of the present invention automatically assign a unique physical address based on a device's physical location in two or more dimensions. This unique address is used both for a unique logical address for communication and physical address to locate the device within the system, which enables efficient reporting of failures and also enables quick replacement of failed devices because the location of the failed device is provided.

For example, error report 510 includes a drive name "xxxx-xxx-xxx," and a location of "server room B, rack 11, shelf 3, over 3 from right side." This information can be provided to a technician to enable efficient servicing of the device. Instead of searching the entire data storage array, the technician is provided detailed location information to locate the device.

It is appreciated that the error report 510 could be provided in any number of forms, including an email or text message. For example, a text message could be provided to a technician identifying the location of a failed drive. In another embodiment, a map could be provided to the technician that indicates where the failed device is located.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of assigning a multi-dimensional physical address to a tape-based data storage device, the method comprising:
    accessing a first signal from a first communication path electrically coupled to a first tape-based data storage device, the first signal indicating a physical position of the first tape-based data storage device with respect to a first axis;
    accessing a second signal from a second communication path electrically coupled to the first tape-based data storage device, the second signal associated with a physical position of the first tape-based data storage device with respect to a second axis;
    determining a unique physical location of the first tape-based data storage device in the second axis based on the second signal; and
    assigning a unique physical address to the first tape-based data storage device, the unique physical address based on the physical position of the first tape-based data storage device in the first axis and based on the physical position of the first tape-based data storage device in the second axis.

2. The method of claim 1, where the first signal is generated by a second tape-based data storage device electrically coupled with the first signal path.

3. The method of claim 2, where the second tape-based data storage device and the first tape-based data storage device reside physically on the first axis.

4. The method of claim 1, comprising:
    accessing a look-up table to determine the unique physical location of the first tape-based data storage device in the second axis based on the second signal.

5. The method of claim 4, where the unique physical location in the second axis is defined by at least three bits of data.

6. The method of claim 1, comprising:
    providing the unique physical location of the first tape-based data storage device in the second axis to a second tape-based data storage device in the second axis.

7. The method of claim 1, comprising:
    accessing a third signal from a third communication path electrically coupled to a first tape-based data storage device, the third signal indicating a physical position of the first tape-based data storage device with respect to a third axis.

8. The method of claim 1, comprising:
    identifying an error associated with the first tape-based data storage device; and
    generating a report of the error, the report including the unique physical address of the first tape-based data storage device.

9. A computer-readable storage medium having computer-executable instructions for performing a method of assigning a multi-dimensional physical address to a tape-based data storage device, the method comprising:
    accessing a first signal from a first communication path electrically coupled to a first tape-based data storage device, the first signal indicating a physical position of the first tape-based data storage device with respect to a first axis;
    accessing a second signal from a second communication path electrically coupled to the first tape-based data storage device, the second signal associated with a physical position of the first tape-based data storage device with respect to a second axis;
    determining a unique physical location of the first tape-based data storage device in the second axis based on the second signal; and
    assigning a unique physical address to the first tape-based data storage device, the unique physical address based on the physical position of the first tape-based data storage device in the first axis and based on the physical position of the first tape-based data storage device in the second axis.

10. The computer-readable storage medium of claim 9, where the first signal is generated by a second tape-based data storage device electrically coupled with the first signal path.

11. The computer-readable storage medium of claim 10, where the second tape-based data storage device and the first tape-based data storage device reside physically on the first axis.

12. The computer-readable storage medium of claim 9, where the method comprises:
    accessing a look-up table to determine the unique physical location of the first tape-based data storage device in the second axis based on the second signal.

13. The computer-readable storage medium of claim 12, where the unique physical location in the second axis is defined by at least three bits of data.

14. The computer-readable storage medium of claim 9, where the method further comprises:
    providing the unique physical location of the first tape-based data storage device in the second axis to a second tape-based data storage device in the second axis.

15. The computer-readable storage medium of claim 9, where the method comprises:
    accessing a third signal from a third communication path electrically coupled to a first tape-based data storage device, the third signal indicating a physical position of the first tape-based data storage device with respect to a third axis.

16. The computer-readable storage medium of claim 9, where the method comprises:
    identifying an error associated with the first tape-based data storage device; and
    generating a report of the error, the report including the unique physical address of the first tape-based data storage device.

17. A system for assigning a multi-dimensional physical address to a tape-based data storage device comprising:
    a first tape-based data storage device comprising:
        a first input for receiving a first signal from a first communication a path electrically coupled to the first tape-based data storage device, the first signal indicating a physical position of the first tape-based data storage device with respect to a first axis;

a second input for accessing a second signal from a second communication path electrically coupled to the first tape-based data storage device, the second signal associated with a physical position of the first tape-based data storage device with respect to a second axis;

a look-up table coupled with the second input for determining a unique physical location of the first tape-based data storage device in the second axis based on the second signal; and an address determiner for generating a unique physical address for the first tape-based data storage device, the unique physical address based on the physical position of the first tape-based data storage device in the first axis and based on the physical position of the first tape-based data storage device in the second axis.

18. The system of claim 17, where the first signal is generated by a second tape-based data storage device electrically coupled with the first signal path.

19. The system of claim 18, where the second tape-based data storage device and the first tape-based data storage device reside physically on the first axis.

20. The system of claim 17, where the unique physical location in the second axis is defined by at least three bits of data in the look-up table.

21. The system of claim 17, comprising:

a first output for providing the unique physical location of the first tape-based data storage device in the second axis to a second tape-based data storage device physically located on the second axis.

22. The system of claim 21, comprising:

a second output for providing the first signal to a third tape-based data storage device physically located on the first axis.

* * * * *